I. STERN.
SOLDERING STRIP.
APPLICATION FILED MAY 20, 1916.
1,202,115.
Patented Oct. 24, 1916.
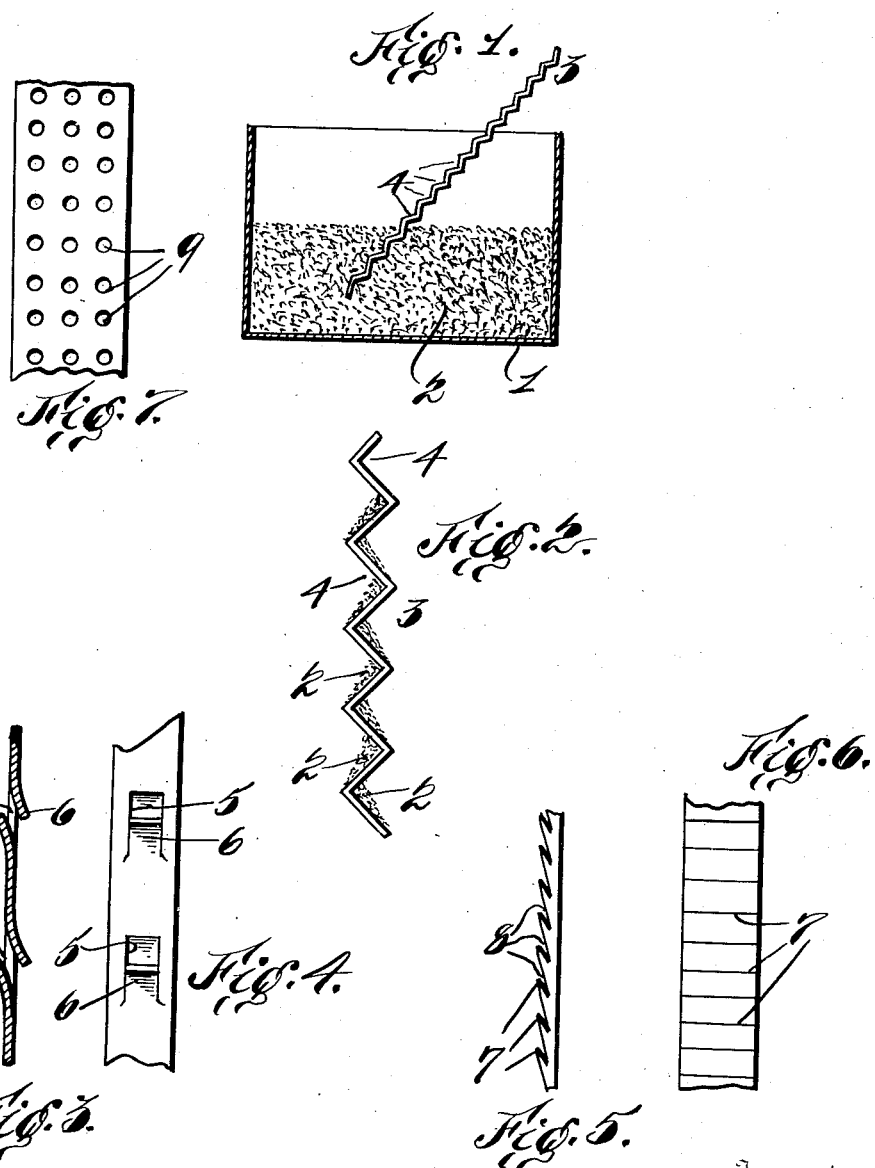

UNITED STATES PATENT OFFICE.

ISIDORE STERN, OF NEW YORK, N. Y.

SOLDERING-STRIP.

1,202,115.  Specification of Letters Patent.  Patented Oct. 24, 1916.

Application filed May 20, 1916. Serial No. 98,763.

*To all whom it may concern:*

Be it known that I, ISIDORE STERN, a citizen of the United States of America, residing at New York city, county of New York, and State of New York, have invented certain new and useful Improvements in Soldering-Strips, of which the following is a full, clear, and exact description.

This invention relates to improvements in stick or strip solder, and has for its object to form strips or sticks of solder in such manner as to cause the same to effectively retain a flux.

My invention is directed more particularly to the improvement of jewelers' or dentists' solder, which is usually supplied in the form of thin flat strips. To apply the solder, with the aid of heat from a blow-pipe or soldering iron, it is necessary to employ a flux either in dry, damp, or liquid form, the flux being usually applied to the surface to be soldered or else the strip is dipped into the flux, which is not altogether a satisfactory operation, as the flux does not adhere to the flat surface of the strip in sufficient quantity to give the desired result. In order to adapt the solder to retain enough flux for soldering purposes, I form the strips in a manner to provide pockets or retaining means to gather a considerable amount of flux after the strip has been dipped and withdrawn from the receptacle containing a flux either in powder or liquid form or dampened powder.

I will now proceed to describe my invention in detail, the essential features of which will be summarized in the appended claims, reference being had to the accompanying drawing, forming part hereof, wherein:

Figure 1 is a sectional view illustrating a receptacle containing a flux, a strip of my improved solder being shown in side elevation; Fig. 2 is an enlarged fragmentary side view illustrating the solder after having been withdrawn from the flux; Figs. 3 and 4 are, respectively, a longitudinal section and a face view of another form of my improvement; Figs. 5 and 6 are, respectively, an edge view and a face view of another form of my improvement; and Fig. 7 is an enlarged fragmentary view of still another embodiment of my invention.

In Fig. 1 a receptacle for solder is indicated by 1, the same containing a flux 2, in this instance in powder form. One form of my improved solder-strip is indicated by 3 and consists of a strip containing pockets or recesses 4 formed by corrugating the said strip as shown. To gather flux the strip 3 will be dipped into the flux 2 and withdrawn. As the strip is drawn out the pockets 4 will extract a small amount of flux and retain the same as illustrated in Fig. 2. It will be apparent that for all practical purposes the strip is fluxed to the full extent of its dipped portion and it is but necessary to apply the flame of a blow-pipe to the solder to melt the same, the flux melting at the same time. If a liquid, or dampened powder-flux is used the same result will take place, namely, the pockets or recesses 4 will be partly filled with the flux.

Instead of corrugating the strips, I may form openings 5 therein as shown in Figs. 3 and 4, the said openings having adjacent thereto shelves 6 formed by striking up the material.

Figs. 5 and 6 illustrate a strip provided with teeth or serrations 7 providing pockets 8.

Fig. 7 illustrates still another embodiment of my invention. In this form, I provide the strip with small openings 9 which will fill up and retain a flux when the strip is dipped.

Having now described my invention, what I claim and desire to secure by Letters Patent is:

1. An elongated strip composed entirely of solder and provided throughout its length with a series of external depressions or pockets extending transversely of the length of the strip and adapted to pick up and hold flux.

2. An elongated strip composed entirely of solder and bent throughout its length into zigzag form providing on each side a series of external depressions or pockets extending transversely of the length of the strip and adapted to pick up flux.

Signed at New York city, N. Y. this 19 day of May, 1916.

ISIDORE STERN.

Witnesses:
EDWARD A. JARVIS,
MAURICE BLOCK.